United States Patent
Dachsbacher et al.

(10) Patent No.: US 11,817,063 B2
(45) Date of Patent: Nov. 14, 2023

(54) PERCEPTUALLY IMPROVED COLOR DISPLAY IN IMAGE SEQUENCES ON PHYSICAL DISPLAYS

(71) Applicant: Karlsruher Institut für Technologie, Karlsruhe (DE)

(72) Inventors: Carsten Dachsbacher, Pfinztal (DE); Emanuel Schrade, Karlsruhe (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 0 days.

(21) Appl. No.: 17/658,468

(22) Filed: Apr. 8, 2022

(65) Prior Publication Data

US 2022/0230601 A1 Jul. 21, 2022

Related U.S. Application Data

(63) Continuation of application No. PCT/EP2020/077424, filed on Sep. 30, 2020.

(51) Int. Cl.
   *G09G 5/06* (2006.01)
   *G09G 5/04* (2006.01)

(52) U.S. Cl.
   CPC .............. *G09G 5/06* (2013.01); *G09G 5/04* (2013.01); *G09G 2320/0693* (2013.01); *G09G 2340/06* (2013.01)

(58) Field of Classification Search
   CPC .. G09G 5/02; G09G 5/06; G09G 5/04; G09G 2320/0693; G09G 2340/06; H04N 1/60;
   (Continued)

(56) References Cited

U.S. PATENT DOCUMENTS

2013/0093783 A1* 4/2013 Sullivan ............... G09G 3/3607
                                                345/601
2016/0323563 A1 11/2016 Sheikh Faridul et al.
(Continued)

FOREIGN PATENT DOCUMENTS

EP          2091226 A1      8/2009

OTHER PUBLICATIONS

International Search Report and Written Opinion for PCT Application No. PCT/EP2020/077424, dated Dec. 2, 2020, 13 pages.
(Continued)

*Primary Examiner* — Antonio A Caschera
(74) *Attorney, Agent, or Firm* — Brake Hughes Bellermann LLP

(57) ABSTRACT

A perceived gamut (PG) of a physical display device presenting frames of an image sequence to a human viewer may be increased. An interface of the system receives a sequence of frames from an image sequence source with each frame having input color data associated with each pixel of the respective frame, the input color data being given in a specified color space. A perceived color computation module computes for each particular frame of the received image sequence perceived colors of each pixel and a frame-specific adapted white point. An optimizer module applies a chromatic adaptation transformation to each window frame to determine display gamut adjusted perceived colors of each pixel of the respective frame and an error per window frame. The chromatic adaptation transformation is updated for all window frames to minimize the determined error, and the current frame is output to the display.

19 Claims, 5 Drawing Sheets

(58) Field of Classification Search
CPC ... H04N 1/6002; H04N 1/6005; H04N 1/6086
See application file for complete search history.

(56) References Cited

U.S. PATENT DOCUMENTS

2017/0262962 A1* 9/2017 Rad .................. G06F 17/18
2019/0279549 A1 9/2019 Shin et al.

OTHER PUBLICATIONS

F. Chang et al.: "Effective Color Correction Via Chromaticity Adjustment and Least Square Approximation," IEEE International Conference on Acoustics, Speech and Signal Processing, ICASSP, May 26, 2013, pp. 1598-1602.

H. Faridul et al.: "Color Mapping: A Review of Recent Methods, Extensions, and Applications," Computer Graphics forum, vol. 35, No. 1, Jul. 29, 2016, pp. 59-88.

M. Fairchild et al.: "Time course of chromatic adaptation for color-appearance judgments," J. Opt. Soc. Am. A, vol. 12, No. 5, May 1995, pp. 824-833.

N. Moroney et al.: "The CIECAM02 color appearance model," Society for Imaging Science and Technology, Color and Imaging Conference, Nov. 12, 2002, 7 pages.

O. Rinner et al.: "Time course of chromatic adaptation for color appearance and discrimination", Vision Research, vol. 40, No. 14, 2000, pp. 1813-1826.

M. Luo et al.: "CIECAM02 and Its Recent Developments", Advanced Color Image Processing and Analysis, Fernandez-Maloigne, C. (ed.), 2013, pp. 19-58.

A. Wilkie et al.: "A Robust Illumination Estimate for Chromatic Adaptation in Rendered Images," Eurographics Symposium on Rendering 2009, vol. 28, No. 4, 2009, 9 pages.

E. Land et al.: "Lightness and Retinex Theory," Journal of the Optical Society of America, vol. 61, No. 1, Jan. 1971, pp. 1-11.

G. Ward: "Picture Perfect RGB Rendering Using Spectral Prefiltering and Sharp Color Primaries," Thirteenth Eurographics Workshop on Rendering, 2002, 8 pages.

G. Sullivan et al.: "Overview of the High Efficiency Video Coding (HEVC) Standard," IEEE Transactions on Circuits and Systems for Video Technology, vol. 22, No. 12, Dec. 2012, pp. 1649-1668.

* cited by examiner

PERCEPTUALLY IMPROVED COLOR DISPLAY IN IMAGE SEQUENCES ON PHYSICAL DISPLAYS

CROSS REFERENCE TO RELATED APPLICATIONS

This application claims priority to, and is a continuation of, PCT/EP2020/077424 filed on Sep. 30, 2020, and entitled "PERCEPTUALLY IMPROVED COLOR DISPLAY IN IMAGE SEQUENCES ON PHYSICAL DISPLAYS," which in turn claims priority to EP Application No. 19202047.7 filed on Oct. 8, 2019, both of which are hereby incorporated by reference in their entireties.

TECHNICAL FIELD

The present description generally relates to electronic data processing, and more particularly, relates to methods, computer program products and systems for enhancing the display gamuts of physical displays when displaying the image frames of an image sequence.

BACKGROUND

Display devices can produce a certain set of colors, the so-called display gamut, which depends on the primary colors used in the display. Often this gamut covers only a fraction of the colors given in an input signal. For example, the color information in an image sequence (e.g., frames of a movie or a dynamic sequence of frames for virtual reality scenes) typically includes colors which lie outside the gamut of the display device. That is, such colors cannot be reproduced by the respective physical display due to the limited gamut of the display device although they could be recognized by the human eye if they could be actually generated by the respective display. As a consequence, the color richness in image sequences displayed on physical display devices is below the color richness of colors actually coded in the respective frames of the image sequence which leads to an inferior color experience for the observer/viewer of the image sequence when compared to the color experience of the human eye observing a scenery in nature or on an ideal, yet not realizable, display.

The gamut, i.e. the set of possible color stimuli, of a display is given by its primary colors (typically red, green, and blue) and, thus, is a fixed and decisive device characteristic. Often the gamut is a limiting factor when displaying images or image sequences with saturated colors. Colors outside the display gamut (but within the color range perceivable by the human eye) are mapped to less saturated colors inside the gamut leading to a less rich color perception by the viewer than provided for by the color information available in the frames of the image sequence.

SUMMARY

There is therefore a need to provide systems and methods for displaying frames of an image sequence on physical display devices with improved perceived colors for human viewers.

The colors that humans actually perceive on the display also depend on chromatic adaptation, which is a property of the human visual system (HVS) that describes the adaptation of color perception of the human eye to the surrounding. In nature it allows humans to perceive colors of objects similarly even if the illuminating light source changes (e.g. from about 2000 Kelvin at sunrise to a slightly blue color with approximately 8000 Kelvin outdoors in shade).

This chromatic adaptation in the HVS also occurs when watching images, animations, and image sequences on a display. It can be characterized by the white point to which an observer is adapted. The so-called chromatic adaptation transformation can then be used to determine how color stimuli generated by the display are perceived by the human. The adaptation process has been intensively studied and happens at different stages of the HVS. Adaptation speeds in the HVS can be modeled as exponential functions. While more than 60% of the chromatic adaptation happens instantaneously (i.e., in less than 20 ms), full chromatic adaptation may take up to 120 seconds. It is to be noted that the chromatic adaptation is different from brightness adaptation where the adaptation involves the pupil of the human eye (changing the size of the translucent area), whereas chromatic adaptation occurs via cone cells of the human eye and signal processing by human cells.

Chromatic adaptation has two consequences: firstly, the perception of a certain color stimulus generated by the display is not always the same. And secondly, perceived colors may lie outside the actual display gamut of the display device. For example, a color stimulus is perceived more saturated when the viewer is adapted to a white point shifted towards the complementary color of the color stimulus.

Chromatic adaptation is a continuously ongoing process which depends on the visual stimuli of the HVS. The well-established color appearance model CIECAM02 allows to calculate how a displayed color is perceived when the viewer is adapted to a specific white point. The adapted white point (i.e. the white point an observer is adapted to) depends on the history of viewed color stimuli. Other color appearance models may be used by the skilled person as well for computing the color perception of a viewer.

Experiments show that the influence of a viewed color on the subsequently changing adapted white point can be modeled by a sum of exponential functions. The part of the field of view that has an influence on adaptation—the adapting field—extends to the whole field of view. The viewer adapts to the viewed stimuli that, in the real world, are predominantly determined by the color of the light source. In an image, this color can be approximated for example by the average color of all pixels (using the gray world assumption) or by the pixel with maximum intensity (assuming specular reflection of the light source by a surface). In short, the adaptation of the human eye can be modeled by computing the white point and the speed of adaptation as described in the above references. Further methods for computing a frame-specific whitepoint are known.

The herein disclosed concepts allow to generate a modified image sequence which is perceived by a human viewer with a higher degree of completeness with regards to the color representation of the input color data as coded in the image. To achieve this effect, the disclosed system and method do not only account for the chromatic adaptation to reproduce colors faithfully, but actively steer the adaptation to extend the perceived display gamut of a viewer beyond the display's physical capabilities. The system computes the actual adapted white point of the observer, and includes an optimization algorithm to determine the white point which is ideal for reproducing the input colors in the subsequent frames of the image sequence (possibly including input colors outside the display gamut). These two white points are generally different. An appropriate transformation is presented which modifies the displayed colors in the image sequence in a manner hardly noticeable or even not noticeable at all by the human viewer but bringing the observers adaptation closer to the ideal white point—eventually extending the gamut of perceived colors in the image sequence. The chromatic adaptation transformation (CAT) is performed in the LMS color space. LMS is a color space which represents the response of the three types of cones of the human eye, named for their responsivity (sensitivity) peaks at long, medium, and short wavelengths. The numerical range is generally not specified, except that the lower end is generally bounded by zero. It is common to use the LMS color space when performing chromatic adaptation transformations for estimating the appearance of a sample under a different illuminant. Typically, the colors to be adapted chromatically (i.e., the input colors) are specified in a color space other than LMS (e.g. sRGB). The chromatic adaptation can be computed by a von Kries transform and operates on tristimulus values in the LMS color space. Every color perception of the HVS can be described in the LMS color space, and colors defined in other color spaces can be transformed into the LMS color space.

In one embodiment, a computer-implemented method is provided for increasing the perceived gamut of a physical display device, and for more accurately reproducing input colors when presenting frames of an image sequence to a human viewer. It is to be noted that the term "increasing the perceived gamut" relates to the effect that the human viewer actually perceives more saturated colors than the maximum color saturation which can be generated by the physical display. The display gamut of the display device is defined by the primary colors of the display device (i.e. the color space of the display device). Most display devices support three primary colors. Some devices support four or even more primary colors. It is to be noted that a physical display gamut could be expanded to cover a broad range of natural colors by further increasing the number of primary colors. However, the skilled person understands that this would dramatically reduce the resolution of the display and is therefore typically not an option to improve color perception on real-world display devices.

The following steps of the computer implemented method can be executed by a computer system which implements respective functional modules. In a first step, a sequence of frames is received from an image sequence source. Such an image sequence source can be a video file which is available in the form of an appropriate data structure, a media player configured to play such video file, a video camera providing a video live stream, a computer game or virtual reality application generating a video output for the user, etc. It is to be noted that image sequence sources may provide an image sequence which is entirely predefined, such as for example, a movie stored on a media storage device. On the other hand, some image sources may provide dynamic videos where future frames are generated in a context-dependent manner, such as for example, the video output of computer games where the following scene depends on the interaction of the user with the game, or virtual and augmented reality scenes which depend on the user's movements.

In one embodiment, in case of dynamic image sequences, the computer system may include an extrapolation module which allows to extrapolate future frames of the image sequence based on the already received sequence of frames. Thereby, a future frame in the context of dynamic image sequences is to be understood as a frame which has not yet been provided by the application producing the dynamic image sequence. Examples for dynamic image sequences are image sequences computed by computer games or virtual reality applications where in some occasions the next frame is computed by the application dynamically based on the context (i.e., the history) of the application. For example, the movement of an object in the received frames can be extrapolated to predict one or more future frames of the image sequence. In another example, a continuous color change which occurred in the already received frames may be used to extrapolate future frames by predicting the continuation of such color change. In contrast, a classic movie file does not include dynamic image sequences as the entire movie is predefined and the order of frames remains unchanged when playing the movie.

Each frame of the received frame sequence has input color data associated with each pixel of the respective frame. The input color data is defined in a specific color space. That is, in a given color space each input color value describes an unambiguous color stimulus for a human viewer. In other words, when the image sequence is recorded or generated, for each pixel of each frame the input color of the pixel is stored as part of the frame data. The input color is a color representation from which a unique color stimulus results for the human viewer. It is to be noted that, for the skilled person, it is clear that the above mentioned transformation of the input data color space into the LMS color space is an implicit feature of the transformation which can be performed at various points in the claimed method. For example, the LMS color space transformation can be directly applied to the received frames before any further processing occurs. In one implementation the LMS transformation occurs during the optimization step as described later on, or it is applied directly before said optimization step which simplifies the optimization step in that the CAT is based on a diagonal matrix operation (component wise scaling). For the final presentation of the transformed frames on the physical display the pixel colors are transformed into the color space of the physical display. Such transformations between the various color spaces are well known in the art.

The system can then compute, in the LMS color space, for each frame of the image sequence the perceived colors of each pixel of the particular frame based on the input color data of the particular frame and a frame-specific adapted white point. Thereby, the frame-specific adapted white point is the white point to which the viewer would be adapted when watching the particular frame on a display capable of showing all perceivable colors. In other words, if the image sequence could be displayed on a display which is capable to show all colors perceivable by the human eye, then the adaptation would occur in relation to the white points of the images based on the original input color values in an image.

A white point in general (often referred to as reference white or target white in technical documents) is a chromaticity value that serves to define the color "white" in image capture, encoding, or reproduction. Depending on the application, different definitions of white are needed to give acceptable results. For example, images taken indoors may be lit by incandescent lights, which are relatively orange compared to daylight (i.e., with a lower color temperature). Defining "white" as daylight will give unacceptable results when attempting to color-correct an image taken with incandescent lighting. An illuminant is characterized by its relative spectral power distribution (SPD). The white point of an illuminant is given as the chromaticity of a white object, reflecting all wavelengths equally, under the illuminant, and can be specified by chromaticity coordinates, such as the x, y coordinates on the CIE 1931 chromaticity diagram (the white point is only related to chromaticity and unaffected by brightness).

The adapted white point depends on the history of viewed color stimuli. The adaptation behavior of the human viewer is known from many experiments. The viewer adapts to the viewed stimuli that, in the real world, are predominantly determined by the color of the light source. When viewing an image, the color to which the viewer adapts (the adapted white point for the image) can be approximated for example by the average color of all pixels (using the gray world assumption) or by the pixel with maximum intensity (assuming specular reflection of the light source by a surface). Being adapted to a white point w means that the viewer perceives w as white. Experimentally it has been shown that the perception of colors changes with the adapted white point and there are several chromatic adaptation transformations (CATs) for modelling the relation of stimuli and perceived colors.

For determining the perceived colors the system initially determines the white point for each frame in the image sequence without considering the display capabilities. Based on the history of frames up to a particular current frame, an adapted white point is computed for the subsequent frame (the frame following the current frame). Methods for computing how the viewer adapts when watching the image sequence are well known in the art. For example, it can be computed as a sum of exponentially-weighted white points of the image frames. Finally, the perceived colors of each pixel in the subsequent frame are computed based on the input colors using the adapted white point (with the assumption that the display can display all perceivable colors). In case the input color data is not in the LMS color space, a corresponding transformation of the color space is executed beforehand as described earlier.

In the next phase of the method the output for the physical display is determined in a way such that the color display constraints of the physical display (i.e. the gamut of the physical display) are taken into account. Thereby, the color of every pixel is manipulated to benefit from the adaptation, in relation to the currently adapted white point and the resulting perceived colors, to increase the range of perceived colors for the human viewer to reproduce the perceived colors more faithfully compared to an ideal display. In other words, the colors of the pixels of the next frame are manipulated to benefit from the adaptation, which is described by the adapted white point. The range of the resulting perceived colors for the human viewer when watching the image sequence increases, and gets closer to that of an ideal display (without display specific gamut limitations). Of course, ideally the manipulation should not be recognizable by the human user. For this purpose, the disclosed method allows the minimization of the error induced by the color manipulation.

This phase is performed by using a sliding window technique where all frames of a frame window starting with the next frame $F_{c+1}$ (following the current frame $F_c$) and ending with a future frame $F_f$ are processed. The sliding window duration is chosen to cover a significant time-span of the chromatic adaptation of the HVS. The slower part of chromatic adaptation has a half-life of approximately 30 sec. Any sliding window duration in the order of this half-life time can be used. When using a larger window duration (and therefore a corresponding higher number of frames) the chromatic adaptation is more accurately taken into account leading to slightly improved results. But also shorter window durations, such as for example five seconds, already cover a large part of the adaptation because of its exponential decay. A person skilled in the art can therefore select a suitable duration of the sliding window which provides a good compromise between additional computation time and further potential improvement of the result.

Once the frames in the sliding window have been processed, the sliding window is shifted by a predefined number of frames n. This processing determined the adjustment for outputting frames $F_{c+1}$ to $F_{c+n}$. The shifted window is processed in the same way as the previous window to generate again the output for the next frames in the shifted sliding window. Thereby, the loop iteration with the shifted sliding window starting with frame $F_{c+1+n}$ and ending with future frame $F_{f+n}$ is applied to the previously already processed frames $F_{c+1}$ to $F_{f+n}$ (i.e., the original frames corrected by the error) and the not yet processed frames $F_{f+1}$ to $F_{f+n}$ for the frames being part of the previous and new sliding window. It is clear for the skilled person that the application of sliding windows requires at least a buffer for storing the frames within the sliding window for further processing. For achieving the highest quality, the sliding window is shifted by only one frame (i.e. n=1). This guarantees that the color adjustments are applied continuously to all frames of the image sequence. In an embodiment with slightly inferior quality, the disclosed optimization may only be applied to every $2^{nd}$ or $3^{rd}$ frame (or to frames at even larger distances) and the adjustment which is determined for the sliding window is also applied to the following frames up to $F_{c+n}$. In this case, the number of frames for shifting the sliding window corresponds to the distance between the sliding windows.

The image processing operations applied to the window frames are also performed in the LMS color space. A chromatic adaptation transformation is applied to each window frame to determine display gamut adjusted perceived colors of each pixel of the respective frame. For example, a von Kries transform can be used to obtain transformed pixel colors from the original input colors. The obtained transformed colors can then be mapped to the display gamut of the physical display device (e.g., through clamping). At this point, the limited display capabilities of the physical display are taken into account and the white points of the transformed and gamut mapped frames are determined. Similar as in the previous phase for computing the perceived colors, in this phase a further adapted white point—the corresponding display gamut adjusted adapted white point—is determined for the subsequent frame $F_{c+1}$. Based on the gamut mapped colors of frame $F_{c+1}$ and the display gamut adjusted adapted white point of frame $F_{c+1}$, the display gamut adjusted perceived colors for each pixel of frame $F_{c+1}$ are computed.

For each window frame of the current sliding window an error is determined. The determined error reflects the difference between the computed perceived colors and the determined display gamut adjusted perceived colors of the respective window frame. In other words, the error is a measure for the distance between the colors of the image as they would be perceived by the human eye on a display without gamut constraints (i.e. an ideal display) and the actually displayed colors as they are perceived by the human eye. Minimizing this error allows to convey a more natural color experience to the human viewer. The minimization of the determined error is achieved by updating the chromatic adaptation transformation for all window frames with adjusted von Kries transforms wherein the adjusted transforms reflect the error correction for the determined error.

Once the current sliding window has been processed as described, the n frames following the current frame are output to the physical display in the color space of the physical display. The corresponding transformation from LMS color space to physical display color space is well known by the person skilled in the art. The sliding window is shifted by n frames as described above.

After the chromatic adaptation transformation has been applied to all the frames of the sliding window and after the error minimization has been performed for a plurality of subsequent sliding windows, the disclosed method and system provide a frame sequence to the user which allows for a smooth color transition towards display gamut adjusted adapted white points of upcoming frames. This smooth transition is typically not recognizable by the human viewer and minimizes color artifacts in the displayed image sequence despite of the chromatic adaptation transformation. And yet, because of the shifted (adjusted) white points (i.e. shifted perceived display gamuts) the human viewer is able to perceive otherwise not displayable colors like or at least close to the original input colors. In cases where an adjustment is not possible to include all the original input colors in the modified perceived display gamuts, at least a more realistic color perception is achieved because of the shift of the adjusted perceived display gamut towards the original input colors.

In one embodiment, a computer program product is provided comprising instructions that, when loaded into a memory of a computing device and executed by at least one processor of the computing device, execute the method steps of the computer implemented method as disclosed herein.

In one embodiment, a computer system is provided for increasing the perceived gamut of a physical display device presenting frames of an image sequence to a human viewer wherein the gamut of the display device is given by the primary colors of the display device. The system has an interface adapted to receive a sequence of frames from an image sequence source with each frame having input color data associated with each pixel of the respective frame. The input color data represents color stimuli. A perceived color computation module of the system is adapted to compute for each particular frame of the received image sequence, in the LMS color space, perceived colors of each pixel of the particular frame based on the input color data of the particular frame and a frame-specific adapted white point. The frame-specific adapted white point is the white point to which the viewer would be adapted when watching the image sequence up to a particular frame on a display capable of showing all perceivable colors.

An optimizer module of the system is adapted to apply, for all window frames of a sliding window starting with a current frame and ending with a future frame, in the LMS color space, a chromatic adaptation transformation to each window frame to determine display gamut adjusted perceived colors of each pixel of the respective frame. This computation is based on a mapping of the corresponding input color data to the display gamut, and is based on a corresponding display gamut adjusted adapted white point. Also the display gamut adjusted adapted white point can be determined in a similar way as the above frame-specific adapted white point. The optimizer determines an error per window frame wherein the error reflects the difference between the computed perceived colors and the determined display gamut adjusted perceived colors of the respective window frame, and updates the chromatic adaptation transformation for all window frames to minimize the determined error.

An output module of the system is adapted to output the n frames following the current frame in the color space of the physical display. After outputting the frames determined by processing the current sliding window the sliding window is shifted by n frames and the optimizer module processes the shifted sliding window in the same way as the current sliding window.

In one embodiment, the system has a frame extrapolation module to determine future frames as a result of an extrapolation of frames of the received sequence in case the received sequence belongs to a dynamically generated image sequence. For example, the extrapolation can take into account how an object was moving in the received frames and extrapolate the objects movement to predict one or more future frames of the image sequence. In another example, a continuous color change which occurred in the already received frames (e.g., an image sequence showing a sun set with an increasing saturation of red colors) may be used to extrapolate future frames by predicting the continuation of such color change. Such extrapolation algorithms are also known from video compression algorithms. Other methods for image extrapolation as known by the person skilled in the art may be used as well. It is to be noted that for applying the disclosed sliding window technique, the extrapolated future frames are buffered together with the frames of the already received image sequence which are included in the sliding window.

Further aspects of the description will be realized and attained by means of the elements and combinations particularly depicted in the appended claims. It is to be understood that both, the foregoing general description and the following detailed description are exemplary and explanatory only and are not restrictive.

SHORT DESCRIPTION OF THE FIGURES

FIG. 1 includes a block diagram of a computer system for increasing the perceived gamut of a physical display device according to an embodiment;

DETAILED DESCRIPTION

Figure 1:
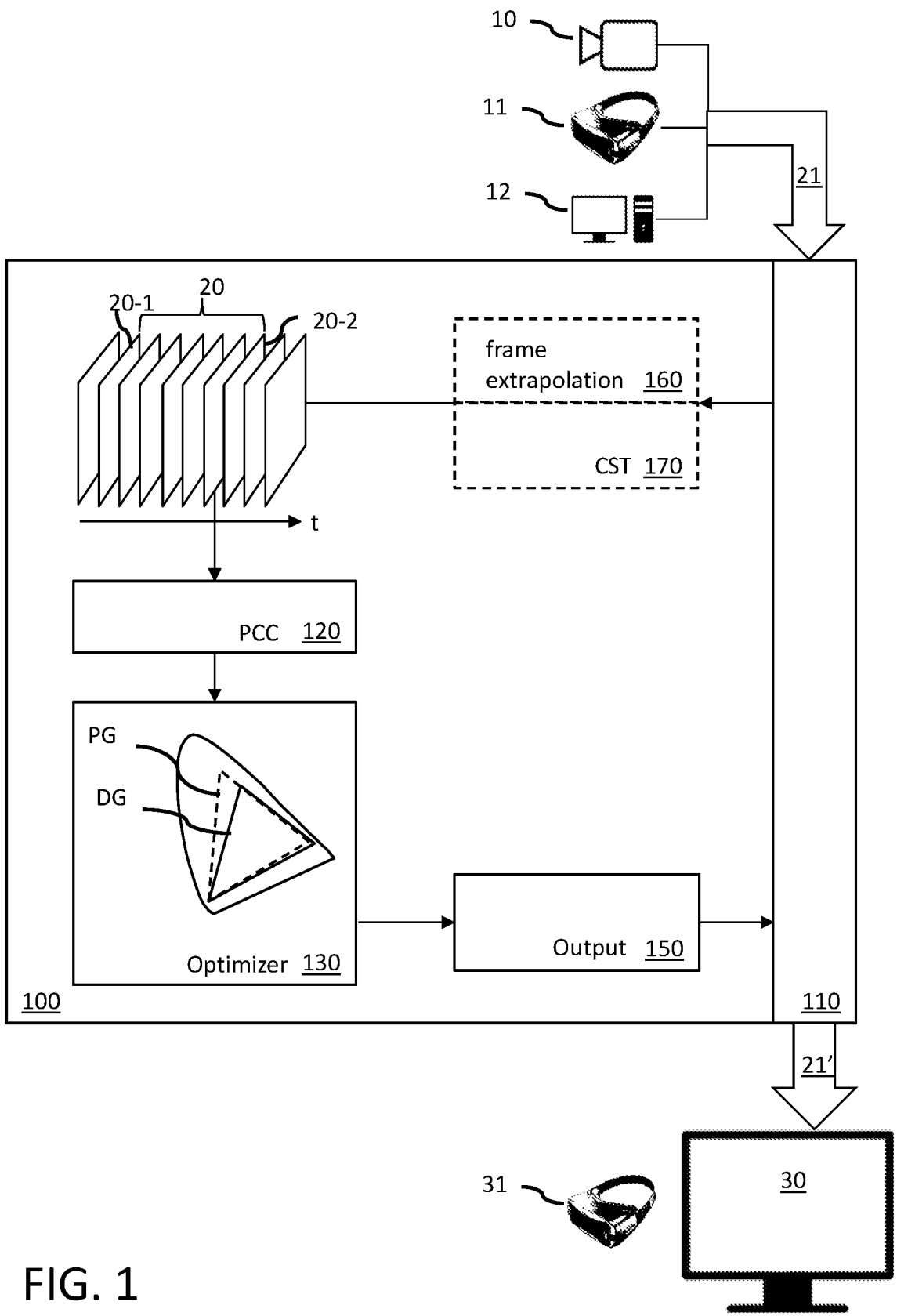
Figure 2:
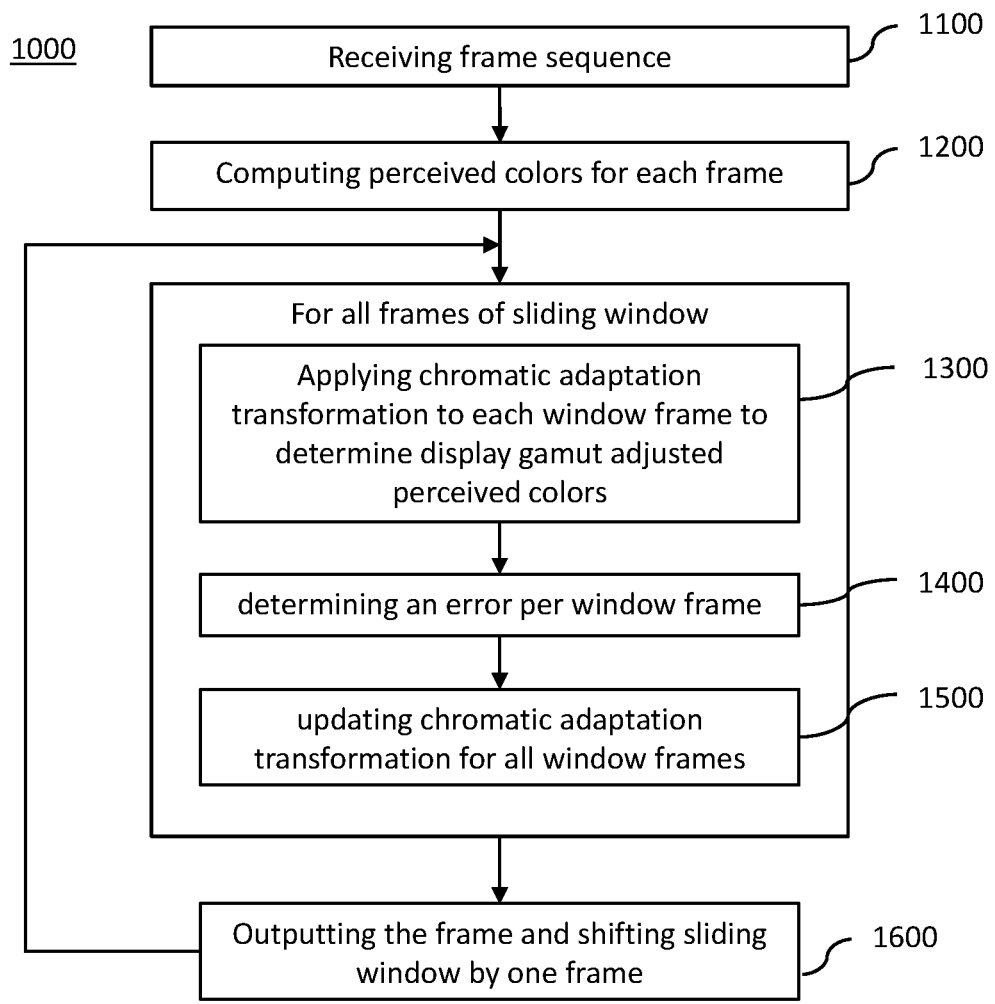
FIG. 2 is a simplified flow chart of a computer-implemented method for increasing the perceived gamut of a physical display device according to an embodiment.

FIG. 1 illustrates a block diagram of an example embodiment of a computer system 100 for increasing the perceived gamut (PG) of a physical display device 30, 31. The output may also be stored as a processed image sequence in a corresponding storage device for later display on a physical display (e.g. a monitor of a computer 32 including the storage device) of for further image processing tasks. The display device displays a modified image sequence 21' which is based on an image sequence 21 provided by an image sequence source 10, 11, 12. FIG. 2 is a simplified flow chart of a computer-implemented method 1000 for increasing the perceived gamut (PG) of a physical display device according to an embodiment. The method 1000 of FIG. 2 is executed by the computer system 100. The description of FIG. 1 refers to the method steps illustrated in FIG. 2. For this reason, reference numbers of FIG. 1 and FIG. 2 are referred to in the following description.

The computer system 100 is communicatively coupled with an image sequence source via the interface 110. Further, the system 100 is communicatively coupled with a physical display device 30, 31 or with an image processing or storage device 32 via the interface 110. The coupling is implemented via standard communication protocols which allow to receive and output image sequences 21, 21'. For example, the image sequence source can be a media player playing a video file provided on a computer 12, or a video stream provided by a video camera or a media player 10, or a computer game 12 or virtual reality application 11 or any other application producing a sequence of output images 21 generating a video output for the user, etc. The physical display device can be any monitor device capable of displaying image sequences to a human viewer. This also includes virtual/augmented reality displays 31 which are available, for example, as virtual reality glasses.

The limitations of such physical display devices with regards to the limited range of colors which can be reproduced by such devices has been discussed at length above. The computer system 100 can increase the perceived gamut PG of the physical display device 30, 31 when presenting frames of an image sequence to a human viewer. The color space of the physical display device corresponds to the (display) gamut DG of the display device and is given by the primary colors of the display device.

The interface 110 receives 1100 a sequence 21 of frames from the image sequence source 10, 11, 12. Each pixel of each frame has input color data given in a specified input color space. That is, in the color space the input colors describe unambiguous color stimuli for a human viewer. However, the physical display may not be capable to display each of such perceivable color values because the color generation components of the display (e.g., LEDs) typically cannot reach color saturation levels as they would still be perceivable by the human viewer.

Figure 3:
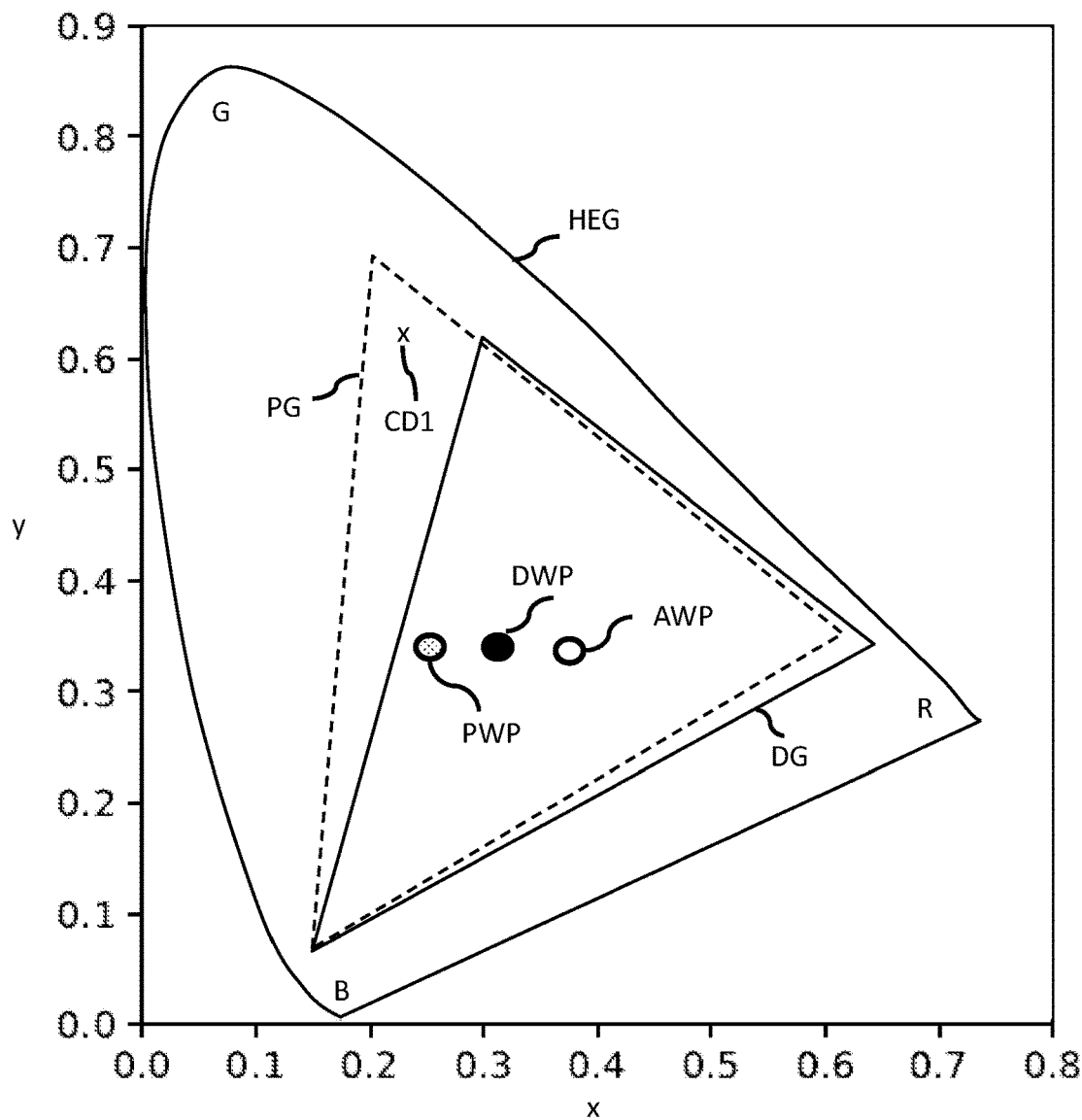
FIG. 3 illustrates the gamut of a human being in comparison to a device gamut and a perceived gamut of the device.

The computer system 100 takes benefit from the effect of chromatic adaptation which occurs when a human viewer watches certain colors for a certain time. The human eye and the processing of the color information by the HVS leads to the effect that the adapted white point of the human viewer depends on the history of the viewed images. This adaptation leads to the effect that the perceived gamut of the physical display is shifted. Turning briefly to FIG. 3, in a graph 300, the shape HEG illustrates the human eye gamut with all perceivable colors in the range blue B, red R, and green G. The triangle DG illustrates the display gamut of the physical display device. In this example, three primary colors define the color space of the physical device. If more than the three primary colors are used, the device gamut DG can become a polygon spanning a larger gamut.

In the example, only colors within the triangle DG can be displayed by the physical display device. The color data CD1 is outside the display gamut DG. The saturation level towards the green color cannot be reproduced by the physical display. The white point DWP associated with the display gamut DG is shown as a black bullet. When the viewer watches a certain image sequence on the display device the chromatic adaptation of the viewer leads to a shift of the white point to the adapted white point AWP dependent on the color composition in the image sequence. In the example, the adapted white point AWP is shifted towards red R. Therefore, the viewer would perceive every color within the display gamut DG more greenish than actually displayed. This leads to a shift of the perceived display gamut PG vs. the display gamut DG towards the colors with a higher saturation level of green G. That is, the perceived gamut PG (illustrated as dashed triangle) is shifted so that the color value CD1 falls into the perceived gamut. In other words, the viewer adapted to AWP can perceive the color value CD1 although the physical display device is not capable to display this color. The computer system 100 uses this effect to shift the adapted white point for the user to a position where the user gets a more realistic perception/impression of the colors of the subsequent frames even if such color values fall outside the display gamut DP of the physical display device.

Figure 4:
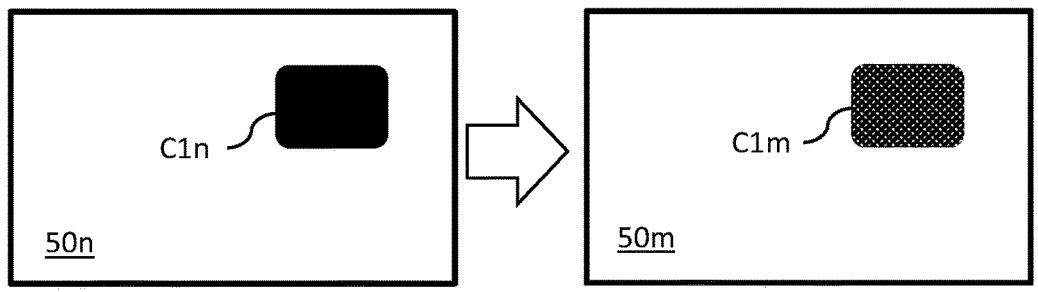
FIG. 4 illustrates chromatic adaption adaptation behavior of a human viewer.

Turning briefly to FIG. 4, the rectangle 50*n* on the left hand represents a frame with color values for each pixel. The pixel area indicated by the black region has a color value C1*n* which falls outside the display gamut. When the display is presenting the frame, the color values of the pixels in the frame are actually mapped to the display gamut leading to a situation where in the displayed image 50*m* the original input color value C1*n* was mapped to a displayable color value C1*m* with a lower level of color saturation. That is, the color richness of the displayed image 50*m* is lower that the color richness in the original frame 50*n* of the image sequence.

Figure 5:
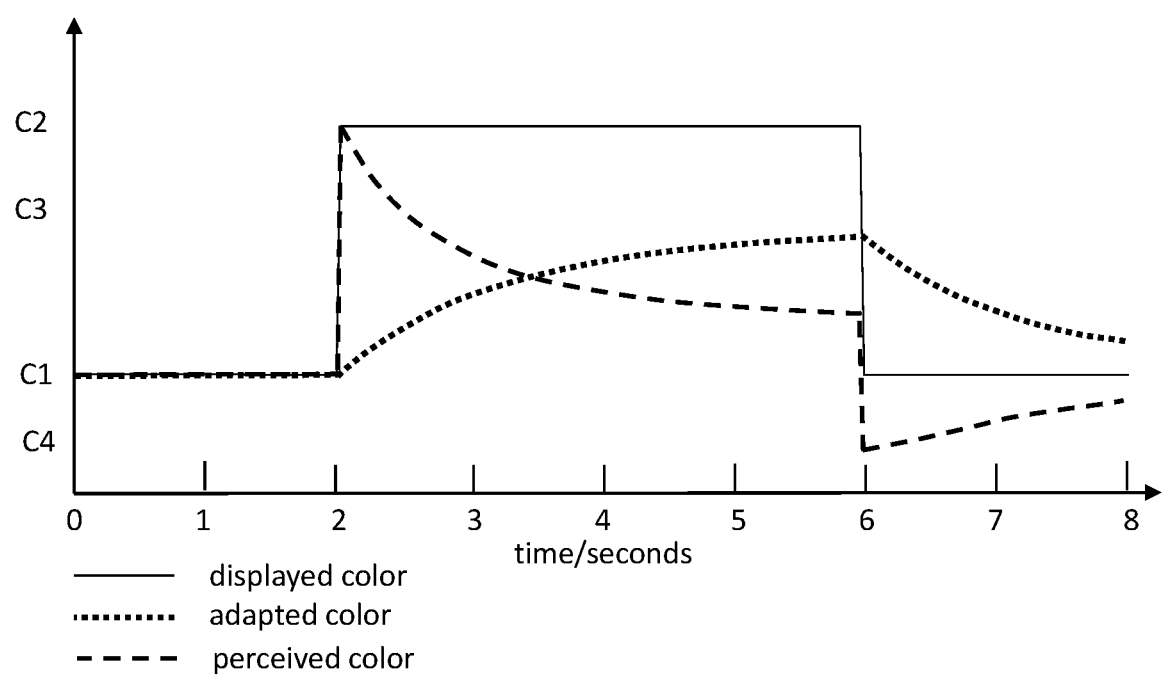
FIG. 5 illustrates color mapping of natural colors to display colors.

Turning briefly to FIG. 5, this figure illustrates the time curve of chromatic adaptation showing an example for two sudden changes of displayed color stimuli with the corresponding adapted and perceived colors. In the example of FIG. 5, initially the viewer is adapted to a first color C1 (e.g., white). After two seconds the displayed color (solid line curve) suddenly changes to C2 and the viewer adapts to the new displayed color C2 over time. However the adaptation (dotted line curve) does not reach the level of C2 but reaches after 4 seconds the color C3. This adaptation results in the displayed color C2 being perceived less saturated which is illustrated by the perceived color curve (dashed line curve). After 6 seconds, the original color C1 is displayed again. However, because of the chromatic adaptation, at 6 seconds, the viewer does not perceive C1 as the original color (e.g., white). Rather, the color is perceived as the complementary color of the currently adapted color C3. Adapted and perceived colors are plotted for the beginning of each frame.

Chromatic adaptation happens at several stages with different adaptation times in the human visual system HVS. Each stage can be modelled by an exponential function and the total degree of adaptation as a sum of those exponentials. Fairchild and Reniff found a fast phase of adaptation and a slow phase (numbers calculated from the averages over all participants):

fast adaptation: half-life $T_0 \approx 0.8$ s, $N_0 \approx 53\%$
slow adaptation: half-life $T_1 \approx 30$ s, $N_1 \approx 47\%$ Here, N denotes the fraction of influence the exponential has on the adaptation and T is the half-life, i.e. the influence of a color viewed T seconds ago is half of the initial influence. Rinner and Gegenfurtner found an additional near-instantaneous adaptation phase finished in less than 25 ms which is part of the fast phase by Fairchild and Reniff. The herein disclosed computer system does not make use of instantaneous adaptation, as this roughly corresponds to the time a single frame is displayed, but focuses on exploiting the aforementioned slow and fast phases.

Using the sum of exponentials for the two phases one can calculate the adapted white point as follows. Starting from an initially adapted white point (e.g. the display white point $w_{disp}$ in LMS color space), a color stimulus c given in LMS color space for t seconds results in an adaptation towards c for a fraction (using $T_i$, where i=0 refers to fast adaptation, and i=1 refers to slow adaptation, respectively):

$$f(t) = \sum_{i=0}^{1} N_i e^{-\alpha_i t}, \alpha_i = \frac{\ln(2)}{T_i} \quad (2)$$

The adapted white point $w_{adapt}$ in LMS color space after t seconds is then $$w_{adapt} = f(t) \cdot w_{disp} + (1 - f(t)) \cdot c$$

Turning back to FIGS. 1 and 2, the color data of the pixels of a particular frame of the received image sequence are denoted $c_{x,y}$ (=colors in the image) in the following.

A perceived color computation module 120 (PCC) of the system computes for each particular frame of the received image sequence 21, the perceived color of each pixel of the particular frame. This computation is always performed in the LMS color space. That is, in case the received color data is not in the LMS color space, the optional color space transformation module 170 (CST) can perform a corresponding transformation to obtain the color stimulus $c_{x,y}'$ in the LMS color space:

$$c_{x,y}' = M \cdot c_{x,y}$$

so that the PCC 120 receives color data in the appropriate color space.

The computation of the perceived colors is based on the input color data of the particular currently presented frame $F_c$ and a frame-specific adapted white point, wherein the frame-specific adapted white point is the white point to which the viewer would adapt when watching this particular frame on a display capable of showing all perceivable colors. In more detail, the PCC 120 initially determines the white points for the particular frame solely based on the input color data (without taking into account the display capabilities). Any one of the previously described methods for determining the white point, or equivalents thereof, may be used:

$$\begin{pmatrix} L_1 \\ M_1 \\ S_1 \end{pmatrix} = whitepoint(\{c_{x,y}'\}),$$

where $\{c_{x,y}'\}$ denotes the set of all pixels in the particular frame.
Where $L_1$, $M_1$, $S_1$ are the components of the white points in the LMS space.

Computing how the viewer adapts when watching the image sequence allows to update the adapted white point for next frame:

$$\begin{pmatrix} L_2 \\ M_2 \\ S_2 \end{pmatrix}_{next} = \sum_{i=0}^{1} N_i \begin{pmatrix} L_{2,i} \\ M_{2,i} \\ S_{2,i} \end{pmatrix}_{next} \text{ with}$$

$$\begin{pmatrix} L_{2,i} \\ M_{2,i} \\ S_{2,i} \end{pmatrix}_{next} = (1-\alpha_i) \begin{pmatrix} L_{2,i} \\ M_{2,i} \\ S_{2,i} \end{pmatrix} + \alpha_i \begin{pmatrix} L_1 \\ M_1 \\ S_1 \end{pmatrix},$$

where $$\begin{pmatrix} L_{2,i} \\ M_{2,i} \\ S_{2,i} \end{pmatrix}$$

are LMS-triples for computing the exponential moving averages of the fast and slow adaptation. Initially it can be assumed that the viewer is adapted to the display white point, but the computation can be carried out with any initial white point. The initialization only affects the first seconds of the output image sequence.

The perceived colors of each pixel in the particular frame can then be computed 1200 using the adapted white point (under the assumption that the display can display all perceivable colors). This computation is performed with a chromatic adaptation transformation CAT with any one of the previously described color appearance models. In the LMS-space, adaptation to a new white point can be calculated by component-wise multiplications and divisions giving the perceived color on an ideal display $p_{x,y}'$:

$$p_{x,y}' = \begin{pmatrix} \frac{L_{white}}{L_2} & 0 & 0 \\ 0 & \frac{M_{white}}{M_2} & 0 \\ 0 & 0 & \frac{S_{white}}{S_2} \end{pmatrix} c_{x,y}'$$

The computed perceived color values now serve as input into the optimizer module 130. The optimizer 130 is initialized with weights for the optimization to provide an optimized display frame i and find transformations for frames of the sliding window (frames $F_{c+1} \ldots F_f$).

To achieve this, the optimizer 130 processes all frames in the sliding window 20 (starting with a current frame 20-1 and ending with a future frame 20-2) and applies 1300 a chromatic adaptation transformation to each window frame to determine display gamut adjusted perceived colors of each pixel of the respective frame based on a mapping of the corresponding input color data to the display gamut, and based on a corresponding display gamut adjusted adapted white point. The sliding window 20 is used to determine the perceived colors of future frames (frames subsequent to the current frame). In interactive applications the future frames can be obtained from extrapolation using the optional frame extrapolation module 160.

In more detail, the weights for the optimization are initialized (e.g. to $f_L = f_M = f_S = 1$). Then the optimization loop starts with transforming the original input color stimuli using the von Kries transform to get colors according to the current weights $f_L$, $f_M$, $f_S$:

$$o_{x,y}'' = \begin{pmatrix} f_L & 0 & 0 \\ 0 & f_M & 0 \\ 0 & 0 & f_S \end{pmatrix} c_{x,y}'$$

In the next step, the optimizer maps the obtained color $o_{x,y}''$ to the display gamut of the physical display device yielding $c_{x,y}''$. For example, this can be implemented through clamping (all values >1 are set to 1, and all values <0 are set to 0).

In the next step, the white point of the transformed and gamut mapped frame is determined:

$$\begin{pmatrix} L_1 \\ M_1 \\ S_1 \end{pmatrix}'' = whitepoint\left(\{c''_{x,y}\}\right),$$

where $\{c''_{x,y}\}$ denotes the set of all pixels in a frame.

In the next step, the adapted white point for the next frame (referred to as display gamut adjusted adapted white point) is determined:

$$\begin{pmatrix} L_2 \\ M_2 \\ S_2 \end{pmatrix}''_{next} = \sum_{i=0} N_i \begin{pmatrix} L_{2,i} \\ M_{2,i} \\ S_{2,i} \end{pmatrix}''_{next} \text{ with}$$

$$\begin{pmatrix} L_{2,i} \\ M_{2,i} \\ S_{2,i} \end{pmatrix}''_{next} = (1 - \alpha_i) \begin{pmatrix} L_{2,i} \\ M_{2,i} \\ S_{2,i} \end{pmatrix}'' + \alpha_i \begin{pmatrix} L_1 \\ M_1 \\ S_1 \end{pmatrix}'',$$

where $$\begin{pmatrix} L_{2,i} \\ M_{2,i} \\ S_{2,i} \end{pmatrix}''$$

are LMS-triples for computing the exponential moving averages of the fast and slow adaptation. Again, initially the viewer is assumed to be adapted to the display white point, but the computation can be carried out with any initial white point.

As the final step of operations in the optimization loop performed on each frame of the sliding window 20, the perceived colors of each pixel in the particular (current) frame (referred to as display gamut adjusted perceived colors) are computed taking into account the physical display properties and HVS adaptation. In other words, the display gamut adjusted perceived colors of each pixel of the current frame are computed based on the mapping of the corresponding input color data of the current frame to the display gamut, and based on the display gamut adjusted adapted white point of the current frame:

$$p''_{x,y} = \begin{pmatrix} \frac{L_{white}}{L''_2} & 0 & 0 \\ 0 & \frac{M_{white}}{M''_2} & 0 \\ 0 & 0 & \frac{S_{white}}{S''_2} \end{pmatrix} c''_{x,y}$$

The optimizer now determines 1400 an error $\epsilon$ per window frame wherein the error reflects the difference between the computed perceived colors and the determined display gamut adjusted perceived colors of the respective window frame:

$$\epsilon(F_i) = \sqrt{\frac{1}{N} \sum_{(x,y)} (p'_{x,y} - p''_{x,y})^2},$$

with $p_{x,y}'$, $p_{x,y}''$ calculated as described above from the input color $c_{x,y} \in F_i$ of Frame $F_i$.

The optimizer tries to minimize this error over all frames of the sliding window. The goal is to shift the adapted white point in a way that non-displayable colors can nevertheless be perceived by the viewer but, at the same time, stay as close as possible to the original input colors.

This is achieved by finally updating 1500 the chromatic adaptation transformation for all window frames of the sliding window 20 to minimize the total determined error of all frames in the sliding window. A plurality of alternative methods (optimization algorithms using e.g. gradient descent, least squares etc.) to minimize the error and thus determining $f_L$, $f_M$, $f_S$ are known to the skilled person.

The output module 150 outputs 1600, in the color space of the physical display, the next n frames of the sliding window 20 and shifts the sliding window by n frames for the optimizer module to continue with computing the next output frames of the image sequence 21'. It is to be noted that functions of the output module 150 can also be integrated in the optimizer module 130. For the transformation of the color data in the LMS color space provided by the optimizer into the color space of the physical display device, the output module 150 may include its own transformation function, or it may call the CST 170 (if available) to perform the transformation.

Figure 6:
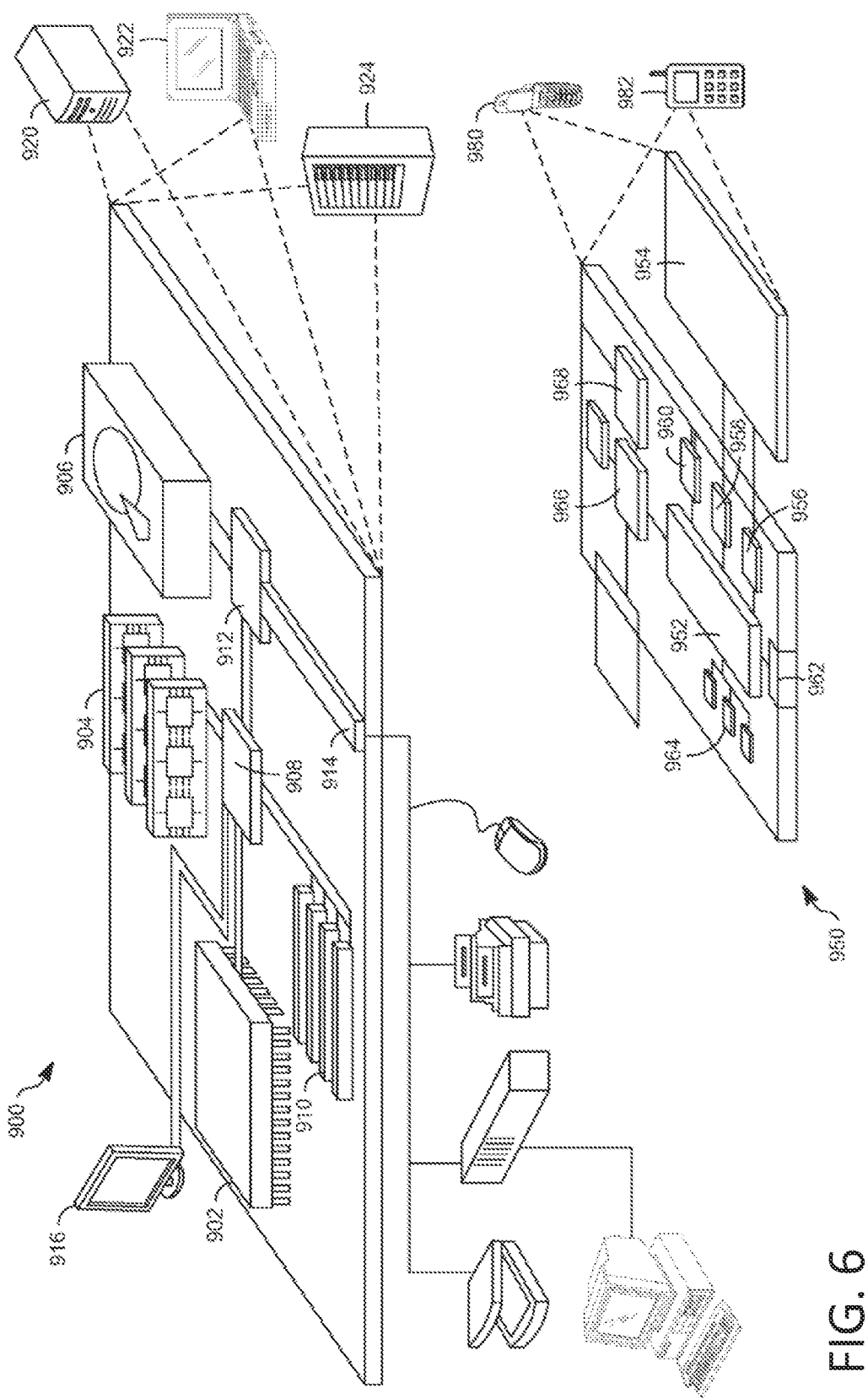
FIG. 6 is a diagram that shows an example of a generic computer device and a generic mobile computer device which may be used with the techniques described herein.

FIG. 6 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, and other similar computing devices. For example, computing device 950 may be used as a GUI frontend for a user to customize the mapping rules. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for increasing a perceived gamut (PG) of a physical display device presenting frames of an image sequence to a human viewer wherein the display gamut (DG) of the display device is given by the primary colors of the display device, the method comprising:

receiving a sequence of frames with each frame having input color data associated with each pixel of the respective frame, the input color data being given in a specified color space;

for each particular frame of the received sequence:
computing, in the LMS color space, perceived colors of each pixel of the particular frame based on the input color data of the particular frame and a frame-specific adapted white point, wherein the frame-specific adapted white point is the white point to which the viewer would be adapted when watching the particular frame on a display capable of showing all perceivable colors;

for all window frames of a sliding window starting with a current frame and ending with a future frame:
applying, in the LMS color space, a chromatic adaptation transformation to each window frame to determine display gamut adjusted perceived colors of each pixel of the respective frame based on a mapping of the corresponding input color data to the display gamut, and based on a corresponding display gamut adjusted adapted white point;

determining an error per window frame wherein the error reflects the difference between the computed perceived colors and the determined display gamut adjusted perceived colors of the respective window frame;

updating the chromatic adaptation transformation for all window frames to minimize a total determined error; and outputting, in the color space of the physical display, a predefined number of frames of the sliding window following the current frame, and shifting the sliding window by the predefined number of frames.

2. The method of claim 1, wherein a particular frame-specific white point is computed by using any one of the following methods: computing the frame-specific white point as the average color of the respective frame; computing the frame-specific white point as the maximum color of the respective frame; computing the frame-specific white point as given by the Retinex theory; computing the frame-specific white point using local shifts; computing the frame-specific white point by picture perfect RGB rendering using spectral pre-filtering and sharp color primaries; computing the frame-specific white point by a robust illumination estimate for chromatic adaptation in rendered images.

3. The method of claim 1, wherein the received frame sequence belongs to a pre-existing video and the future frame is part of the received frame sequence.

4. The method of claim 1, wherein the received frame sequence belongs to a dynamically generated sequence of frames and the future frame is a result of an extrapolation of frames of the already received sequence.

5. The method of claim 1, wherein the frame-specific adapted white point is determined with an exponential moving average function.

6. The method of claim 1, wherein the perceived color computation computes the perceived colors of each pixel by using a color appearance model selected from any one of the following: CIECAM02, CIELAB, Nayatani model, Hunt model, RLAB, LLAB, CIECAM97s, IPT, ICtCp, and iCAM06.

7. The method of claim 1, wherein the chromatic adaptation transformation is computed by a von Kries transform and operates on tristimulus values in the LMS color space.

8. A non-transitory computer-readable medium storing executable instructions that, when executed by at least one processor of a computing device, cause the computing device to increase a perceived gamut (PG) of a physical display device presenting frames of an image sequence to a human viewer wherein the display gamut (DG) of the display device is given by the primary colors of the display device, the instructions, when executed by the at least one processor, cause the computing device to:
    receive a sequence of frames with each frame having input color data associated with each pixel of the respective frame, the input color data being given in a specified color space;
    for each particular frame of the received sequence:
        compute, in the LMS color space, perceived colors of each pixel of the particular frame based on the input color data of the particular frame and a frame-specific adapted white point, wherein the frame-specific adapted white point is the white point to which the viewer would be adapted when watching the particular frame on a display capable of showing all perceivable colors;
    for all window frames of a sliding window starting with a current frame and ending with a future frame:
        apply, in the LMS color space, a chromatic adaptation transformation to each window frame to determine display gamut adjusted perceived colors of each pixel of the respective frame based on a mapping of the corresponding input color data to the display gamut, and based on a corresponding display gamut adjusted adapted white point;
        determine an error per window frame wherein the error reflects the difference between the computed perceived colors and the determined display gamut adjusted perceived colors of the respective window frame;
        update the chromatic adaptation transformation for all window frames to minimize a total determined error; and
    output, in the color space of the physical display, a predefined number of frames of the sliding window following the current frame, and shifting the sliding window by the predefined number of frames.

9. The non-transitory computer-readable medium of claim 8, wherein the received frame sequence belongs to a pre-existing video and the future frame is part of the received frame sequence.

10. The non-transitory computer-readable medium of claim 8, wherein the received frame sequence belongs to a dynamically generated sequence of frames and the future frame is a result of an extrapolation of frames of the already received sequence.

11. The non-transitory computer-readable medium of claim 8, wherein the frame-specific adapted white point is determined with an exponential moving average function.

12. The non-transitory computer-readable medium of claim 8, wherein the chromatic adaptation transformation is computed by a von Kries transform and operates on tristimulus values in the LMS color space.

13. A computer system for increasing the perceived gamut (PG) of a physical display device presenting frames of an image sequence to a human viewer wherein the gamut (DG) of the display device is given by the primary colors of the display device, the system comprising:
    at least one processor;
    at least one memory storing instructions that are executable by the at least one processor to implement:
        an interface adapted to receive a sequence of frames from an image sequence source with each frame having input color data associated with each pixel of the respective frame, the input color data being given in a specified color space;
        a perceived color computation module adapted to compute for each particular frame of the received image sequence, in the LMS color space, perceived colors of each pixel of the particular frame based on the input color data of the particular frame and a frame-specific adapted white point, wherein the frame-specific adapted white point is the white point to which the viewer would be adapted when watching the particular frame on a display capable of showing all perceivable colors;
        an optimizer module adapted to, for all window frames of a sliding window starting with a current frame and ending with a future frame,
            apply, in the LMS color space, a chromatic adaptation transformation to each window frame to determine display gamut adjusted perceived colors of each pixel of the respective frame based on a mapping of the corresponding input color data to the display gamut, and based on a corresponding display gamut adjusted adapted white point;
            determine an error per window frame wherein the error reflects the difference between the computed perceived colors and the determined display gamut adjusted perceived colors of the respective window frame;
            update the chromatic adaptation transformation for all window frames to minimize a total determined error; and
        an output module adapted to output, in the color space of the physical display, a predefined number of frames following the current frame, and shifting the sliding window by the predefined number of frames for the optimizer module.

14. The system of claim 13, further comprising:
    a frame extrapolation module adapted to determine the frames up to the future frame as a result of an extrapolation of already received frames of the received image sequence in case the received image sequence belongs to a dynamically generated sequence of images.

15. The system of claim 13, further comprising:
    a color space transformation module adapted to transform color data of pixels from a first color space into a second color space.

16. The system of claim 13, wherein a particular frame-specific white point is computed by using any one of the following methods: computing the frame-specific white point as the average color of the respective frame; computing the frame-specific white point as the maximum color of the respective frame; computing the frame-specific white point as given by the Retinex theory; computing the frame-specific white point using local shifts; computing the frame-specific white point by picture perfect RGB rendering using spectral prefiltering and sharp color primaries; computing the frame-specific white point by a robust illumination estimate for chromatic adaptation in rendered images.

17. The system of claim 13, wherein the frame-specific adapted white point is determined with an exponential moving average function.

18. The system of claim 13, wherein the perceived color computation module is adapted to compute the perceived colors of each pixel by using a color appearance model selected from any one of the following: CIECAM02, CIELAB, Nayatani model, Hunt model, RLAB, LLAB, CIECAM97s, IPT, ICtCp, and iCAM06.

19. The system of claim 13, wherein the chromatic adaptation transformation is computed by a von Kries transform and operates on tristimulus values in the LMS color space.

* * * * *